United States Patent
Retersdorf et al.

(10) Patent No.: US 10,544,705 B2
(45) Date of Patent: Jan. 28, 2020

(54) RANKINE CYCLE POWERED BY BLEED HEAT

(71) Applicant: Hamilton Sundstrand Corporation, Charlotte, NC (US)

(72) Inventors: Alan Retersdorf, Avon, CT (US); Brian St. Rock, Andover, CT (US); Thomas P. Filburn, Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 15 days.

(21) Appl. No.: 15/923,621

(22) Filed: Mar. 16, 2018

(65) Prior Publication Data

US 2019/0284965 A1    Sep. 19, 2019

(51) Int. Cl.
| F01K 23/06 | (2006.01) |
| F22B 1/18 | (2006.01) |
| F01K 9/00 | (2006.01) |
| F02C 6/08 | (2006.01) |
| F01D 19/00 | (2006.01) |
| F02C 9/18 | (2006.01) |
| F01L 19/00 | (2006.01) |

(52) U.S. Cl.
CPC ............... *F01K 23/06* (2013.01); *F01K 9/00* (2013.01); *F01L 19/00* (2013.01); *F02C 6/08* (2013.01); *F02C 9/18* (2013.01); *F22B 1/18* (2013.01)

(58) Field of Classification Search
CPC . F01K 23/06; F01K 9/00; F01D 19/00; F02C 9/18; F02C 6/08; F22B 1/18
USPC .............................................. 60/39.182, 655
See application file for complete search history.

(56) References Cited

U.S. PATENT DOCUMENTS

| 4,683,715 A * | 8/1987 | Iizuka | F02C 7/26 60/39.41 |
| 4,896,499 A * | 1/1990 | Rice | F01D 5/185 60/39.182 |
| 5,722,229 A | 3/1998 | Provost | |
| 5,937,633 A | 8/1999 | Wang | |
| 5,979,156 A * | 11/1999 | Uematsu | F01K 23/10 60/39.182 |
| 6,092,361 A | 7/2000 | Romani | |

(Continued)

FOREIGN PATENT DOCUMENTS

| CN | 104443394 A | 3/2015 |
| CN | 204552947 U | 8/2015 |

(Continued)

OTHER PUBLICATIONS

Extended European Search Report for EP Application No. 19163193. 6, dated Jul. 18, 2019, Pages 8.

*Primary Examiner* — Hoang M Nguyen
(74) *Attorney, Agent, or Firm* — Kinney & Lange, P.A.

(57) ABSTRACT

A system and method of using the system includes an open-loop path and a closed-loop path. The open-loop path is configured to extract bleed air from a compressor section of a gas turbine engine through a bleed air port and discharge bleed air to an ambient environment. The closed-loop path is configured to circulate a working fluid through a heat exchanger, a turbine, and a condenser with a pump. The heat exchanger is fluidly coupled to the bleed air port and configured to extract heat from the bleed air to boil the working fluid for driving the turbine and a component rotationally coupled to the turbine.

19 Claims, 7 Drawing Sheets

(56) References Cited

U.S. PATENT DOCUMENTS

| | | |
|---|---|---|
| 6,906,432 B2 | 6/2005 | Belokon et al. |
| 7,174,716 B2 | 2/2007 | Brasz et al. |
| 7,775,031 B2 | 8/2010 | Wood |
| 8,181,463 B2 | 5/2012 | Batscha et al. |
| 9,068,506 B2 | 6/2015 | Eleftheriou et al. |
| 9,206,710 B2 | 12/2015 | Gurin |
| 2002/0175522 A1 | 11/2002 | Wacknov et al. |
| 2004/0255590 A1 | 12/2004 | Rago et al. |
| 2006/0254280 A1* | 11/2006 | Briesch .............. F01D 19/00 60/772 |
| 2010/0021284 A1 | 1/2010 | Watson et al. |
| 2010/0037623 A1 | 2/2010 | Jewess et al. |
| 2010/0064688 A1 | 3/2010 | Smith |
| 2010/0083632 A1 | 4/2010 | Foster et al. |
| 2010/0107651 A1 | 5/2010 | Hyde et al. |
| 2011/0094227 A1 | 4/2011 | Ast et al. |
| 2012/0000204 A1 | 1/2012 | Kesseli et al. |
| 2012/0151934 A1 | 6/2012 | Borissov et al. |
| 2014/0174084 A1 | 6/2014 | Kontomaris |
| 2014/0290208 A1 | 10/2014 | Rechain et al. |
| 2014/0318131 A1 | 10/2014 | Artinian et al. |
| 2014/0352315 A1 | 12/2014 | Diaz |
| 2015/0014994 A1 | 1/2015 | Nordstrom et al. |
| 2015/0069758 A1 | 3/2015 | Davidson et al. |
| 2016/0131032 A1 | 5/2016 | Pomme |
| 2017/0030266 A1 | 2/2017 | Cerny et al. |
| 2017/0292447 A1 | 10/2017 | Himmelmann et al. |

FOREIGN PATENT DOCUMENTS

| | | |
|---|---|---|
| CN | 104763533 B | 1/2017 |
| DE | 102013205239 A1 | 9/2014 |
| EP | 1386837 A1 | 2/2004 |
| EP | 1983038 A1 | 10/2008 |
| EP | 2131105 A1 | 12/2009 |
| WO | WO2010121255 A1 | 10/2010 |

* cited by examiner

RANKINE CYCLE POWERED BY BLEED HEAT

BACKGROUND

The present invention is related generally to gas turbine engines and, more particularly, to systems powered by bleed air extracted from the gas turbine engine.

Gas turbine engines operate by compressing a primary air flow stream received through an inlet, combusting an air-fuel mixture within a combustor, and directing the exhaust stream of the combustion process to perform work on a turbine before discharging the exhaust. Some gas turbine engines include auxiliary flow paths that extract a portion of the primary air flow passing through a compressor section of the gas turbine engine to form a bleed air stream. Bleed air can be used to perform work ancillary to the primary combustion process of the gas turbine engine, among other functions.

For example, in a typical environmental control system (ECS), bleed air provides the air needed to power an air cycle machine (ACM) of the ECS, remove aircraft heat loads, and provide air for other functions. In particular, air cycle machines provide a means of conditioning air provided to an aircraft passenger cabin and/or other aircraft systems. Air cycle machines operate by expanding compressed bleed air across a turbine in which bleed air imparts potential and/or kinetic energy to turbine blades to cause rotation of the turbine shaft. Because bleed air extracted from a compressor section of the gas turbine engine has elevated pressure and temperature relative to an upstream compressor stage and ambient air conditions, a heat exchanger is used to reduce the bleed air temperature prior to the air cycle machine. Typically, the waste heat is discharged to the ambient environment without preforming any work and thereby reduces an overall efficiency of the gas turbine engine.

Because increasing gas turbine engine efficiency continues to be a goal for aircraft engine manufacturers, a need exists to utilize the waste bleed air heat to perform work for auxiliary engine systems and/or other aircraft systems.

SUMMARY

A system for powering a Rankine cycle with bleed heat includes an open-loop path and a closed-loop path. The open-loop path is configured to extract bleed air from a compressor section of a gas turbine engine through a bleed air port and discharge bleed air to an ambient environment. The closed-loop path is configured to circulate a working fluid and includes a heat exchanger, a turbine, a condenser, and a pump in sequential series along a direction of the working fluid flow. The heat exchanger is fluidly coupled to the bleed air port and configured to extract heat from the bleed air to vaporize the working fluid, converting the working fluid form a liquid phase at a heat exchanger inlet to a gaseous phase at a heat exchanger outlet. The turbine is fluidly coupled to the outlet of the heat exchanger and is driven rotationally by imparting kinetic energy, potential energy, or a combination of kinetic energy and potential energy from the working fluid to the turbine. The condenser is fluidly coupled to a turbine outlet and is configured to condense the working fluid into the liquid phase. The pump is configured to circulate the working fluid within the closed-loop path by imparting work to the working fluid and delivering the working fluid to a heat exchanger inlet. The system further includes a component driven rotationally by the first turbine.

A method of utilizing bleed air to drive a Rankine cycle includes directing bleed air through an open-loop path and circulating a working fluid within a closed-loop path. Directing bleed air through the open-loop path includes: 1) extracting bleed air from a compressor section of a gas turbine engine through a bleed air port, and 2) discharging bleed air to an ambient environment through a discharge port. Circulating the working fluid within the closed-loop path includes: 1) circulating the working fluid within the closed-loop path using a pump, 2) directing the working fluid through a heat exchanger that places the working fluid in a heat exchange relationship with the bleed air such that the working fluid is converted from a liquid phase at an inlet of the heat exchanger to a gaseous phase at an outlet of the heat exchanger, 3) expanding the working fluid in the gaseous phase across a turbine fluidly coupled to the outlet of the heat exchanger, and 4) using a condenser fluidly coupled to an outlet of the turbine to convert the working fluid from the gaseous phase to the liquid phase. The method further includes using the turbine to rotationally drive a component.

DETAILED DESCRIPTION

In a typical environmental control system (ECS), a heat exchanger upstream from an air cycle machine pre-cools bleed air extracted from a compressor section of a gas turbine engine. This waste bleed air heat is rejected to a ram air circuit, which receives a flow of ambient air exterior to the aircraft, or ram air. The ram air flow passes through the heat exchanger and receives the bleed air heat rejected from the environmental control system before discharging the ram air to the ambient environment. This waste bleed air heat can be utilized by replacing the ram air circuit with a closed-loop configured as a Rankine cycle, which is a thermodynamic cycle which uses a working fluid to convert heat into mechanical work while the working fluid undergoes a phase change.

Using a Rankine cycle to recover bleed air heat permits additional work to be performed than is otherwise possible using a prior art system and is particularly beneficial for recovering waste heat from bleed-air-powered air cycle machines. For example, as will be described further below, the waste heat can be used to drive an electric generator in order to provide electric power to other auxiliary aircraft systems. Furthermore, the waste heat can be used to drive an auxiliary compressor or an auxiliary pump. This utilization of previously unused bleed heat energy increases the overall efficiency of the gas turbine engine.

The following bleed heat recovery systems are non-exclusive embodiments of systems which use a Rankine cycle to recover waste heat from a bleed air circuit. Although some of the following embodiments describe implementation with an air cycle machine, the benefits of a bleed-air-power Rankine cycle can be realized within any bleed-air powered system in which a portion of the bleed air heat is not fully utilized to perform work.

Figure 1A:
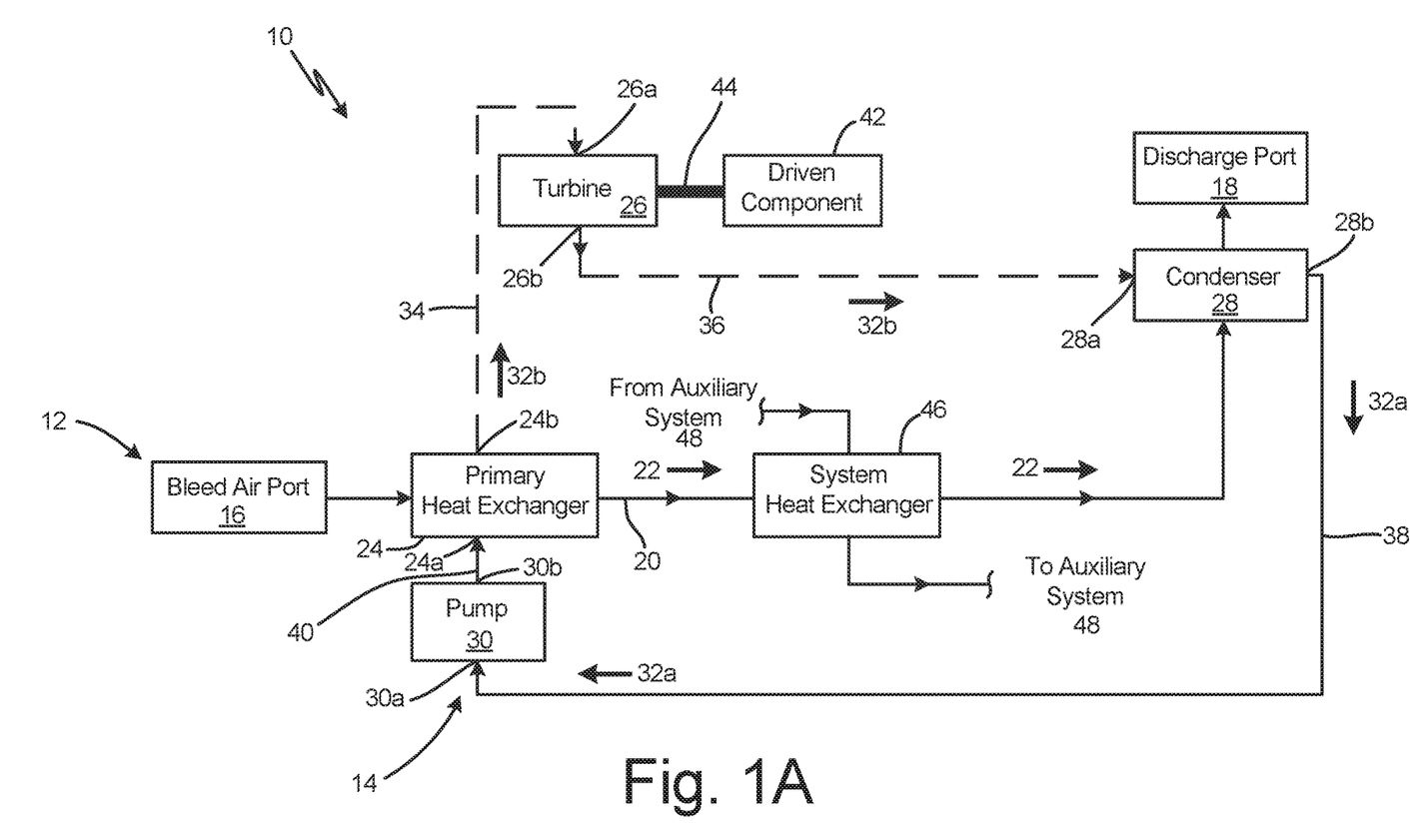
FIG. 1A is a schematic of a bleed-heat-powered Rankine cycle configured with a single turbine along the closed-loop path.

FIG. 1A is a schematic of bleed heat recovery system 10 in which open-loop path 12 is placed in a heat exchange relationship with closed-loop path 14. Open-loop path 12 includes inlet port 16, discharge port 18, and bleed air line 20 fluidly connecting inlet port 16 to discharge port 18. During operation of the gas turbine engine, open-loop path 12 receives bleed air 22 through inlet port 16 (i.e., a bleed air port) that is extracted from a compressor section of the gas turbine engine and discharges bleed air to the ambient environment external to the gas turbine engine through discharge port 18. Although not shown in FIG. 1A and the subsequent figures, open-loop path 12 may include a bleed air valve used to control a flowrate or pressure of bleed air through open-loop path 12.

Closed-loop path 14 circulates working fluid 32 and includes heat exchanger 24, turbine 26, condenser 28, and pump 30 arranged sequentially in series along a direction of working fluid flow. Vapor line 34 fluidly connects outlet 24b of heat exchanger 24 to inlet 26a of turbine 26, and vapor line 36 fluidly connects outlet 26b of turbine 26 to closed-loop inlet 28a of condenser 28. Liquid line 38 fluidly connects closed-loop outlet 28b of condenser 28 to inlet 30a (i.e., low-pressure side) of pump 30. Liquid line 40 fluidly connects outlet 30b (i.e., high-pressure side) of pump 30 to inlet 24a of heat exchanger 24. As indicated by working fluid liquid phase 32a and vapor phase 32b notations, vapor lines 34 and 36 contain primarily gaseous working fluid, and liquid lines 38 and 40 contain primarily liquid working fluid. Vapor lines 34 and 36, liquid lines 38 and 40 along with heat exchanger 24, turbine 26, condenser 28, and pump 30 form a closed circuit path for circulating working fluid 32 using a Rankine cycle.

Heat exchanger 24 can be a heat exchanger of any conventional design that places bleed air 22 within open-loop path 12 in a heat exchange relationship with working fluid 32 circulated within closed-loop path 14. Because heat exchanger 24 is configured to vaporize or boil working fluid 32, the flowrate per unit area of heat transferred from bleed air 22 to working fluid 32, or heat flux, is greater than a threshold heat flux necessary to convert working fluid 32 from liquid phase 32a at heat exchanger inlet 24a to gaseous phase 32b at heat exchanger outlet 24b. Furthermore, the minimum design heat flux exceeds the threshold heat flux by a margin sufficient to account for a range of ambient conditions and engine operating conditions such that vapor lines 34 and 36 contain primarily gaseous working fluid 32b for a range of ambient conditions and engine operating conditions.

Turbine 26 is adapted to extract potential energy (i.e., energy derived from working fluid static pressure), kinetic energy (i.e., energy derived from working fluid dynamic pressure or fluid velocity), or a combination of potential and kinetic energy. Extracting energy from gaseous working fluid 32b involves providing blade geometry (not shown) to interact with gaseous working fluid 32b such that gaseous working fluid 32b imparts rotation to turbine 26. Due to the extraction of energy, working fluid 32b at outlet 26b has: a) an outlet pressure that is less than an inlet pressure, b) an outlet velocity that is less than an inlet velocity, or c) an outlet pressure and velocity that are less than an inlet pressure and velocity, respectively.

Condenser 28 can be a condenser of any conventional design that converts gaseous working fluid 32b into liquid working fluid 32a by placing working fluid 32 in a heat exchange relationship with a heat sink. As shown in FIG. 1A, condenser 28 places working fluid 32 in a heat exchange relationship with bleed air 22 discharged from heat exchanger 24. In another embodiment described below, working fluid 32 extracted from the outlet-side of pump 30 can be used. As a result, condenser 28 extracts heat from working fluid 32 within closed-loop 14 and imparts heat to bleed air 22 within open-loop path 12.

Pump 30 can be a mechanically-driven or an electrically-driven pump configured to act on and impart work to working fluid 32a received through pump inlet 30a. Due to pressure losses associated with circulating working fluid 32 through closed-loop 14, the work imparted by pump 30 to working fluid 32 causes a pressure of working fluid 32 at outlet 30b to be greater than a pressure of working fluid 32 at pump inlet 32a by an amount sufficient to overcome pressure losses at a design flow rate of working fluid 32 through closed-loop 14.

Using closed-loop 14, thermal energy extracted from bleed air 22 within open-loop 12 is utilized to rotationally drive turbine 26 in order to convert the thermal energy extracted from closed-loop 12 into mechanical work at turbine 26. This work can be utilized by rotationally coupling driven component 42 to turbine 26 via shaft 44. For example, driven component 42 can be a generator capable of producing electric power. In other embodiments, driven component 42 can be an auxiliary compressor, and in still other embodiments, driven component 42 can be an auxiliary pump.

In some embodiments, closed-loop path 12 includes system heat exchanger 46 that receives bleed air 22 discharged from heat exchanger 24 and discharges bleed air 22 to condenser 28. Heat exchanger 46 can be used to extract additional heat from bleed air 22 and reject the heat to auxiliary system 48. Auxiliary system 48 can be any system utilizing a fluid suitable for heat rejection. For instance, auxiliary system 48 can be a fuel system or a lubrication system, among others. If bleed heat recovery system 10 is equipped with heat exchanger 46, bleed air 22 delivered to condenser 28 has a lower temperature than an analogous system 10 without heat exchanger 46, permitting condenser 28 to more effectively condense gaseous working fluid 32b.

Although closed-loop path 14 is configured to circulate a fixed amount of working fluid 32 during normal, steady-state operation, closed-loop path 14 may include overpressure protection measures (not shown) that release a portion of working fluid 32 from closed-loop path 14 when a pressure threshold is exceeded and a make-up tank (not shown) designed to provide additional working fluid 32 to the system during abnormal or periodic system events. For example, overpressure protection could be incorporated into closed-loop path 14 using a pressure relief valve (not shown) along vapor line 34, which under normal operation has a maximum working fluid pressure resulting from the vaporization of working fluid 32 within heat exchanger 24. An additional pressure relief valve (not shown) may be included along liquid line 40 to reduce pressure within closed-loop 14 when the working fluid paths through heat exchanger 24 are fully or partially obstructed. In other embodiments, the pressure relief valve can be incorporated into a relief line that fluidly couples the pressure relief valve to a lower pressure region of closed-loop path 14. In still other embodiments, the pressure relief valve can discharge working fluid to the ambient environment.

Figure 1B:
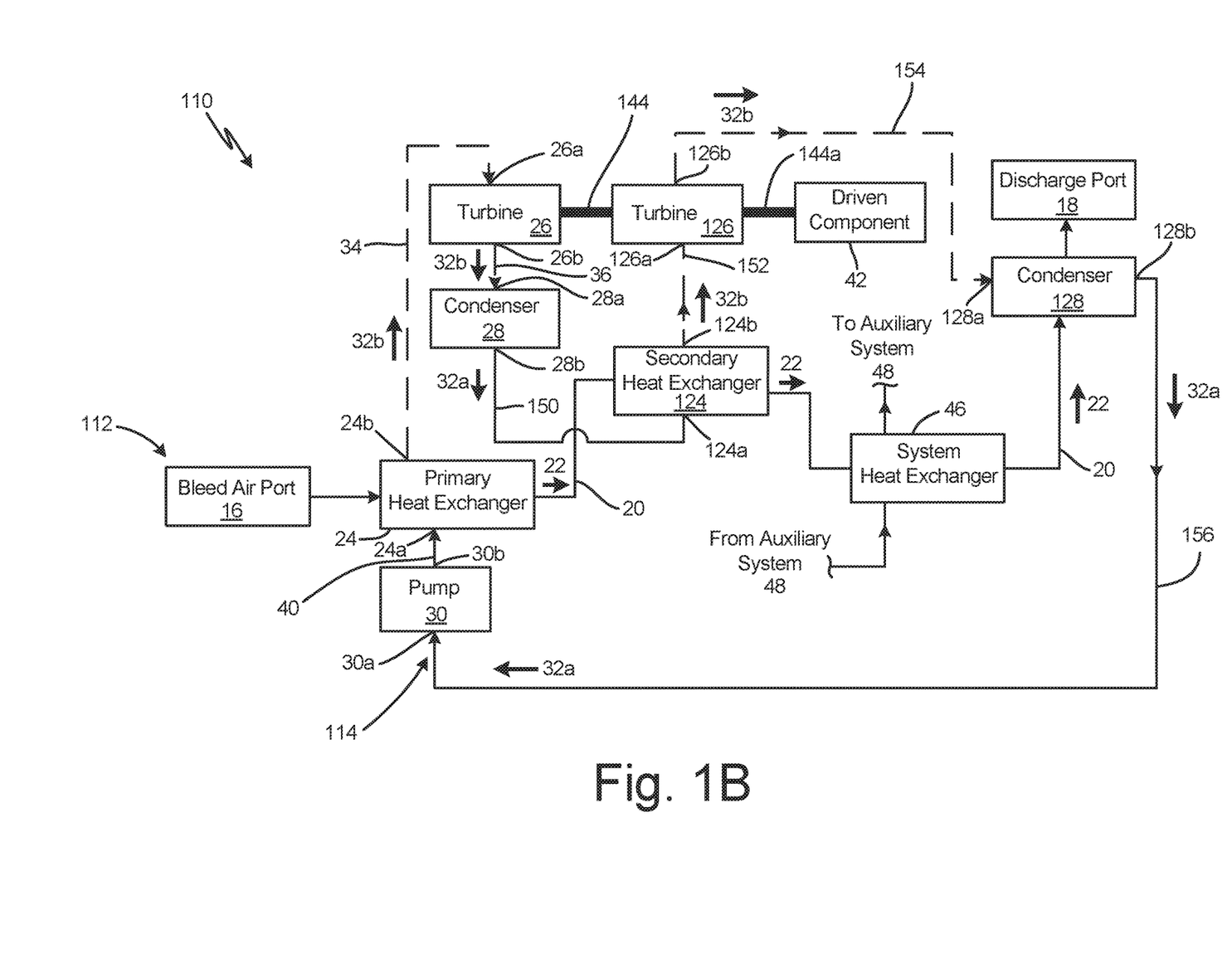
FIG. 1B is a schematic of a bleed-heat-powered Rankine cycle configured with multiple turbines along the closed-loop path.

FIG. 1B is a schematic of bleed heat recovery system 110 in which open-loop path 112 is placed in a heat exchange relationship with closed-loop path 114. Bleed heat recovery system 110 contains many of the components of bleed heat recovery system 10 and, in addition, includes second heat exchanger 124, second turbine 126, and second condenser 128 arranged sequentially in series along a direction of working fluid flow within closed-loop path 114 between condenser 28 and pump 30. Components of bleed heat recovery system 110 with the same reference numbers as system 10 are configured and function in the previously described manner.

Second heat exchanger 124 can be a heat exchanger of any conventional design that places bleed air 22 within open-loop path 112 in a heat exchange relationship with working fluid 32 circulated within closed-loop path 114. Second heat exchanger 124 is configured to vaporize working fluid 32 in liquid phase 32a discharged from condenser 28 and, like heat exchanger 24, is designed to provide a minimum heat flux that exceeds a threshold heat flux by a margin sufficient to convert working fluid 32 from liquid phase 32a to gaseous phase 32b given a range of ambient conditions and engine operating conditions.

The configuration of second turbine 126 is similar to turbine 26 in all respects except second turbine 126 is adapted to extract energy from working fluid 32b downstream from turbine 26, condenser 28, and heat exchanger 124. Accordingly, the total pressure of working fluid 32 at inlet 126a of turbine 126 is lower than the total pressure of working fluid 32b at inlet 26a of turbine 26, making turbines 26 and 126 a high pressure turbine and a low pressure turbine, respectively. Because turbine 126 extracts additional energy from working fluid 32, working fluid 32b at outlet 126b relative to inlet 126a has: a) an outlet pressure that is less than an inlet pressure, b) an outlet velocity that is less than an inlet velocity, or c) an outlet pressure and velocity that are less than an inlet pressure and velocity, respectively. Furthermore, turbine 126 can be rotationally coupled to turbine 26 and component 42 to drive component 42 rotationally with turbine 26. For instance, turbine 26 can be coupled to turbine 126 via shaft 144, and turbines 26 and 126 can be coupled to component 42 via shaft 144a. Alternatively, turbine 126 can be rotationally coupled to a separate component (not shown) via a shaft that is uncoupled from component 42. This additional component can be any of the previously described embodiments of component 42.

Second condenser 128 can be a condenser of any conventional design that converts gaseous working fluid 32b into liquid working fluid 32a by placing working fluid 32 in a heat exchange relationship with a heat sink. As shown in FIG. 1B, condenser 128 places working fluid 32 in a heat exchange relationship with bleed air 22 discharged from second heat exchanger 124 and, like condenser 28, can reject heat to bleed air 22. Alternatively, condenser 128 can be configured as a flash tank in a manner described below. As a result, condenser 128 extracts heat from working fluid 32 within closed-loop path 114 and imparts heat to bleed air 22 within open-loop path 112.

In place of liquid line 38 of system 10, bleed heat recovery system 110 includes liquid lines 150 and 156 as well as vapor lines 152 and 154. Liquid line 150 fluidly connects outlet 28b of condenser 28 to inlet 124a of second heat exchanger 124. Vapor line 152 fluidly connects outlet 124b of second heat exchanger 124 to inlet 126a of second turbine 126. Vapor line 154 fluidly connects outlet 126b of second turbine 126 to closed-loop inlet 128a of second condenser 128. Liquid line 156 fluidly connects closed-loop outlet 128b of second condenser 128 to inlet 30a of pump 30. As the naming convention suggests, liquid lines 150 and 156 contain working fluid 32 primarily in liquid phase 32a while vapor lines 152 and 154 contain working fluid 32 primarily in gaseous phase 32b.

With the addition of second heat exchanger 124, bleed heat recovery system 110 is capable of extracting more heat energy from bleed air 22 within open-loop 112 while maintaining small heat exchanger size relative to a comparable system 10. Thus, utilizing two heat exchangers permits extraction of more heat energy from bleed air without the additional challenge of allocating the physical space necessary to extract the same amount of heat energy with a single heat exchanger. Increased bleed air heat extraction also lowers bleed air temperature before entering condenser 128 and, thus, provides a greater temperature difference between the working fluid and bleed air to increase condenser performance.

Figure 2:
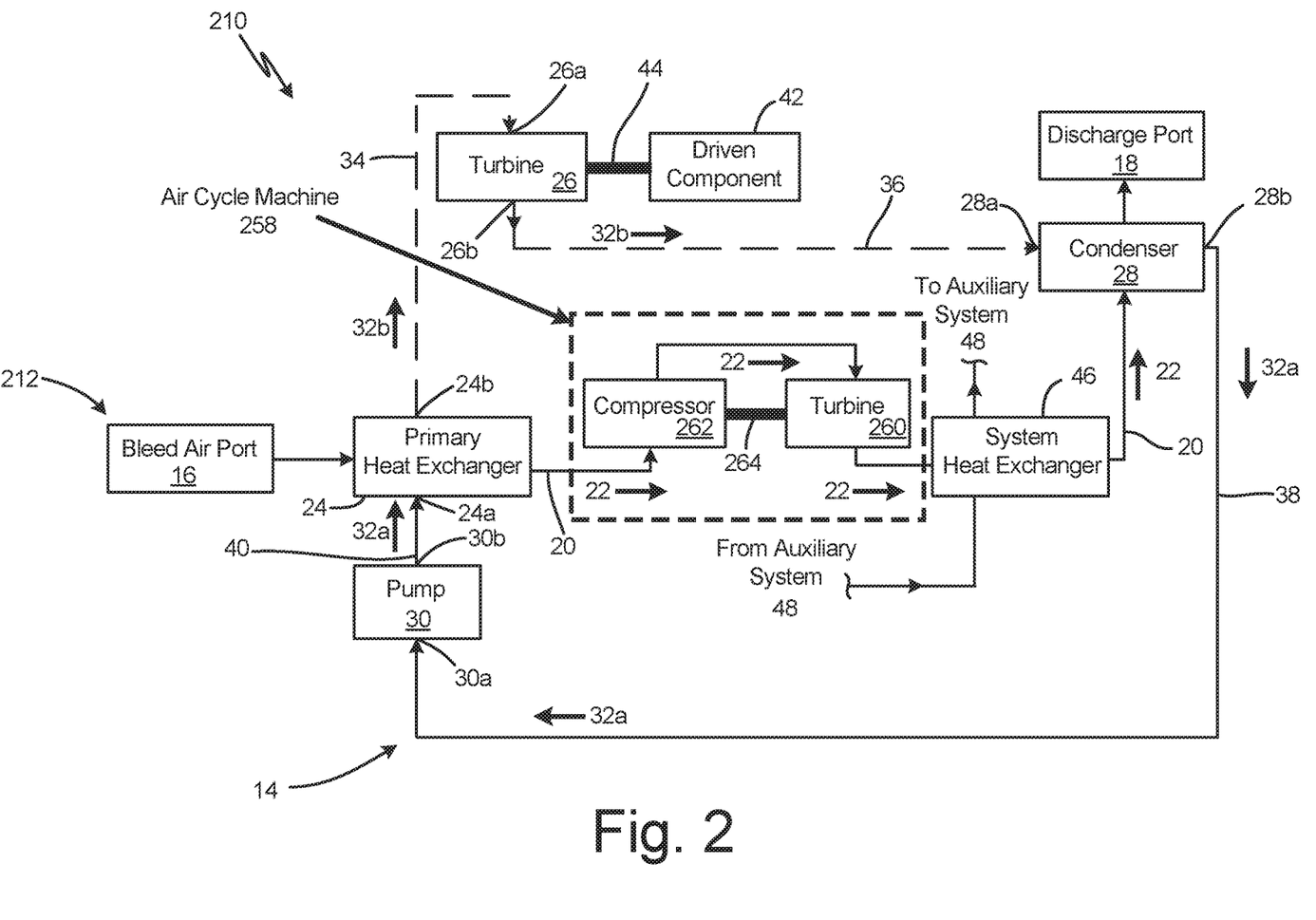
FIG. 2 is a schematic of the bleed-heat-powered Rankine cycle of FIG. 1A utilizing bleed air to drive an air cycle machine.

FIG. 2 is a schematic of bleed heat recovery system 210 in which open-loop path 212 is placed in a heat exchange relationship with closed-loop path 14 as described in system 10. Open-loop path 212 contains all of the components of open-loop path 12, which are configured and function in the same way as described with respect to system 10, and in addition, open-loop path 212 contains air cycle machine 258 driven by bleed air 22 discharged from heat exchanger 24. In particular, air cycle machine 258 includes at least turbine 260 having blade geometry (not shown) configured to extract kinetic energy, potential energy, or a combination of kinetic and potential energy from bleed air 22.

By expanding bleed air 22 across turbine 260, bleed air 22 discharged from an outlet of turbine 260 has a reduced temperature, making bleed air 22 more suitable to condition air delivered via auxiliary system 48 to an aircraft cabin, or other system requiring conditioned air, using system heat exchanger 46. Closed-loop path 14 contains the same components as system 10, each identically-numbered component being configured and functioning in the same way as described with respect to system 10. Bleed heat recovery system 210 improves overall engine efficiency by utilizing heat energy extracted by heat exchanger 24 to drive component 42 rather than discharging the heat energy to the ambient environment.

Further, air cycle machine 258 can include compressor 262 rotationally coupled to and driven by turbine 260 via shaft 264. In operation, compressor 262 receives bleed air discharged from heat exchanger 24, imparting work to bleed air 22 and thereby increasing static pressure of the bleed air. In embodiments configured with compressor 262, turbine 260 receives bleed air 22 discharged from compressor 260 instead of receiving bleed air 22 directly discharged from heat exchanger 24.

Figure 3:
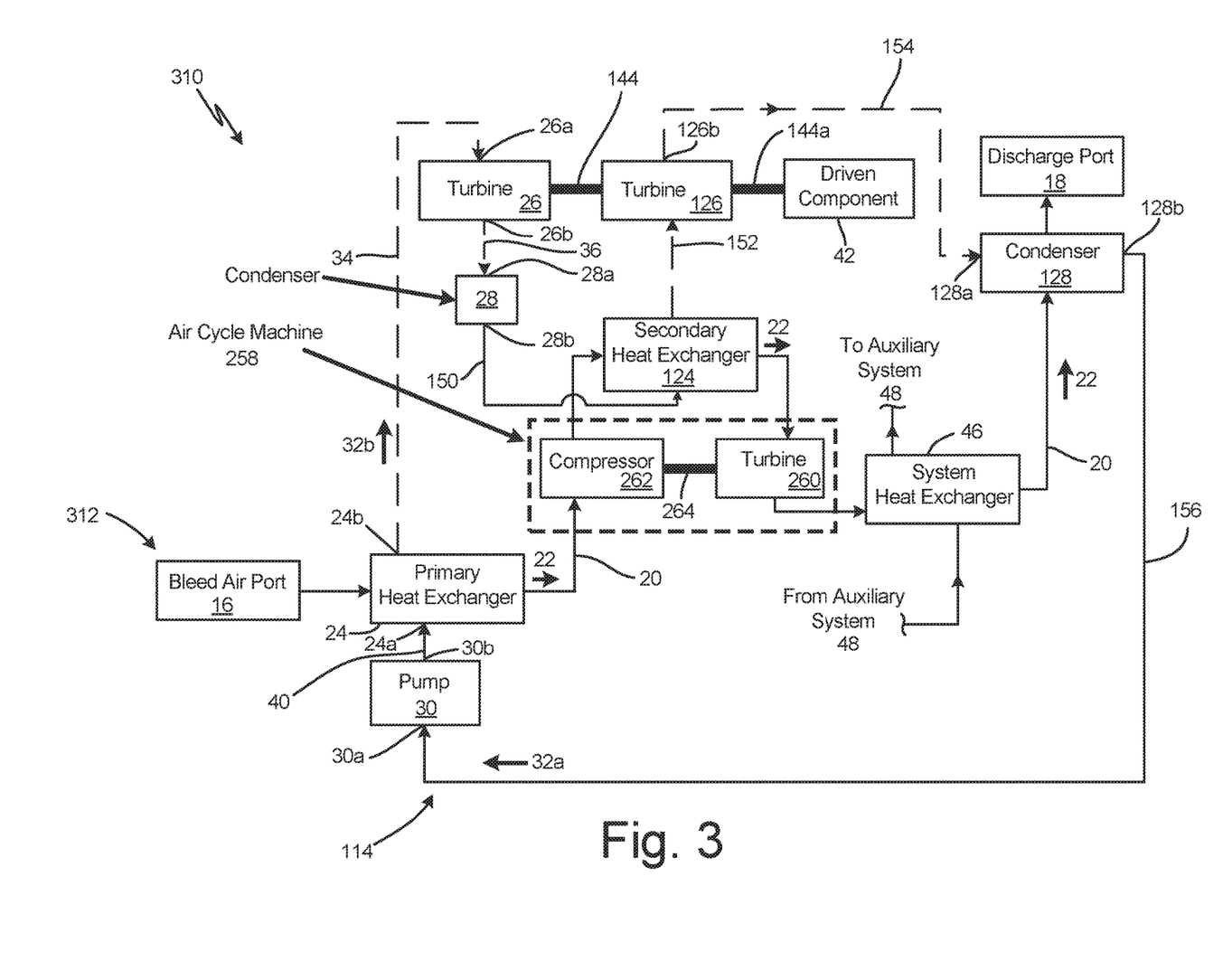
FIG. 3 is a schematic of the bleed-heat-powered Rankine cycle of FIG. 1B utilizing bleed air to drive an air cycle machine.

FIG. 3 is a schematic of bleed heat recovery system 310 in which open-loop path 312 is placed in a heat exchange relationship with closed-loop path 114 as described for system 110. Open-loop path 312 contains all of the components of open-loop path 112, which are configured and function in the same way as described in system 110, and in addition, open-loop path 312 contains air cycle machine 258 with at least turbine 260 as well as compressor 262 and shaft 264. Air cycle machine 258 and its associated components are configured and function in the same manner described with respect to system 212. However, within bleed heat recovery system 310, bleed air 22 discharged from compressor 262 is placed in a heat exchange relationship with working fluid 32 using second heat exchanger 124 instead of delivering working fluid 32 directly to turbine 260. Bleed air 22 discharged from heat exchanger 124 expands across turbine 260 and thereby, cools by an amount suitable for use within system heat exchanger 46, which as discussed above, can be used to condition air circulated by auxiliary system 48 to an aircraft cabin, or other system requiring conditioned air.

Figure 3A:
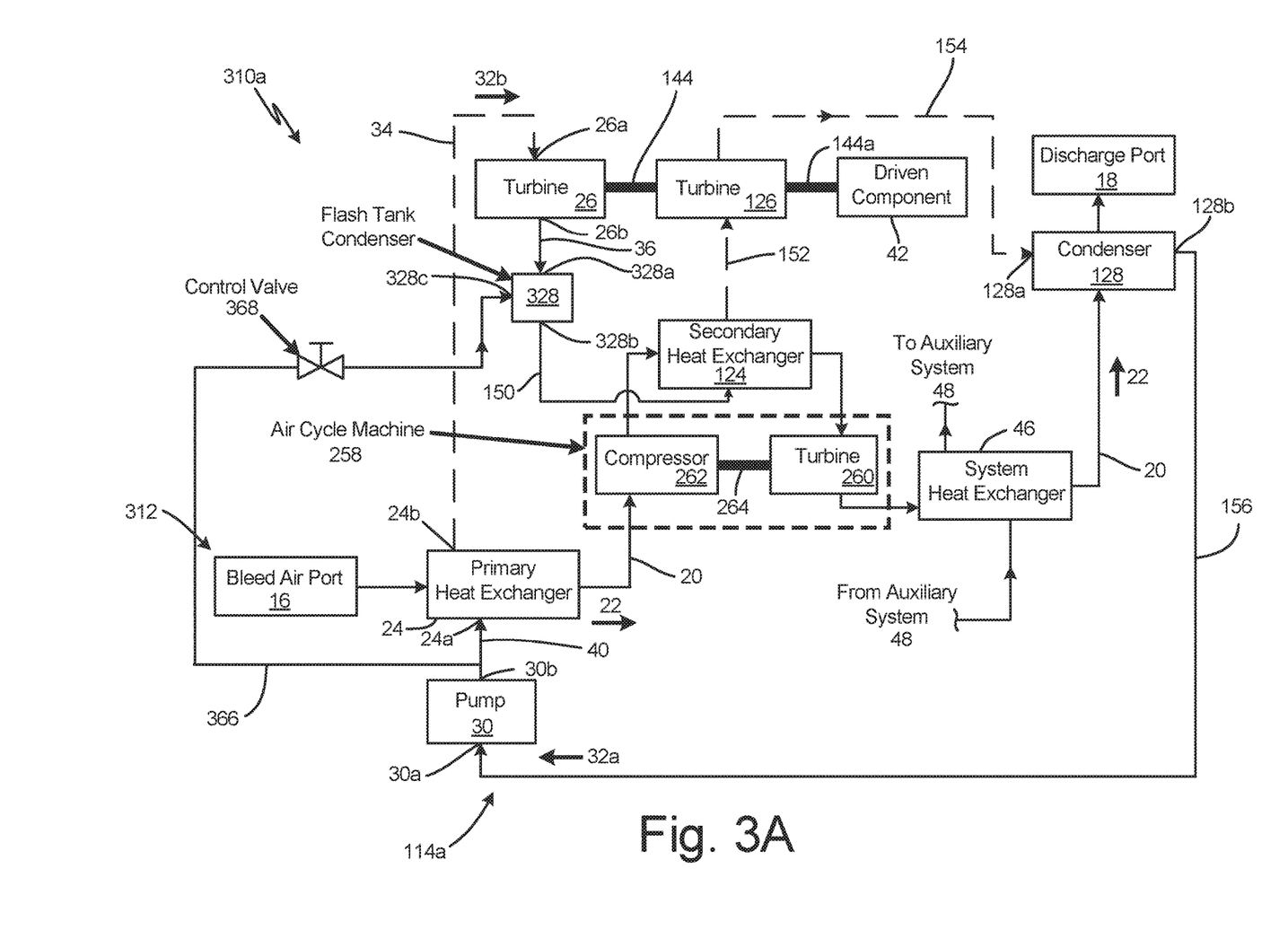
FIG. 3A is a schematic of the bleed-heat-powered Rankine cycle of FIG. 3 that incorporates a flash tank condenser.

FIG. 3A is a schematic of bleed heat recovery system 310a, which contains all of the components of system 310 except closed-loop 114 is replaced with closed-loop 114a equipped with flash tank 328 in place of condenser 28. Flash tank 328 uses a condensing medium sprayed into flash tank 328 at condenser port 328c to condense working fluid 32 from gaseous phase 32b at condenser inlet 328a to liquid phase 32a at condenser outlet 328b. For example, the condensing medium can be working fluid 32 diverted from an outlet side or high-pressure side of pump 30 through bypass path 366. Bypass path 366 fluidly connects pump outlet 30b to condenser port 328c of spray tank 328. In operation, pressurized working fluid 32 discharges into spray tank 328 to condense gaseous working fluid 32b, which has a higher temperature relative to liquid working fluid 32a extracted through bypass path 366. Condenser working fluid 32 as well as working fluid used as the condensing medium are discharged from spray tank outlet 328b and enter liquid line 150.

Bypass line 366 may include control valve 368 positioned along bypass line 366 to regulate one of a pressure of working fluid 32 delivered to condenser port 328c or a flow rate of working fluid 32 discharged through condenser port 328c. Embodiments equipped with a pressure-regulating control valve 368 may also include a nozzle at condenser port 328c to limit the flow rate and atomize working fluid 32 discharged into spray tank 328.

Furthermore, even though spray tank 328 is shown replacing condenser 28 of bleed heat recovery system 210a, spray tanks can be used to replace any of the other condenser components in any of bleed heat recovery systems 10, 110, 210, 310 and 310b, system 310b being described below. All other identically-numbered components are configured and operate in the same was as previously described.

Figure 3B:
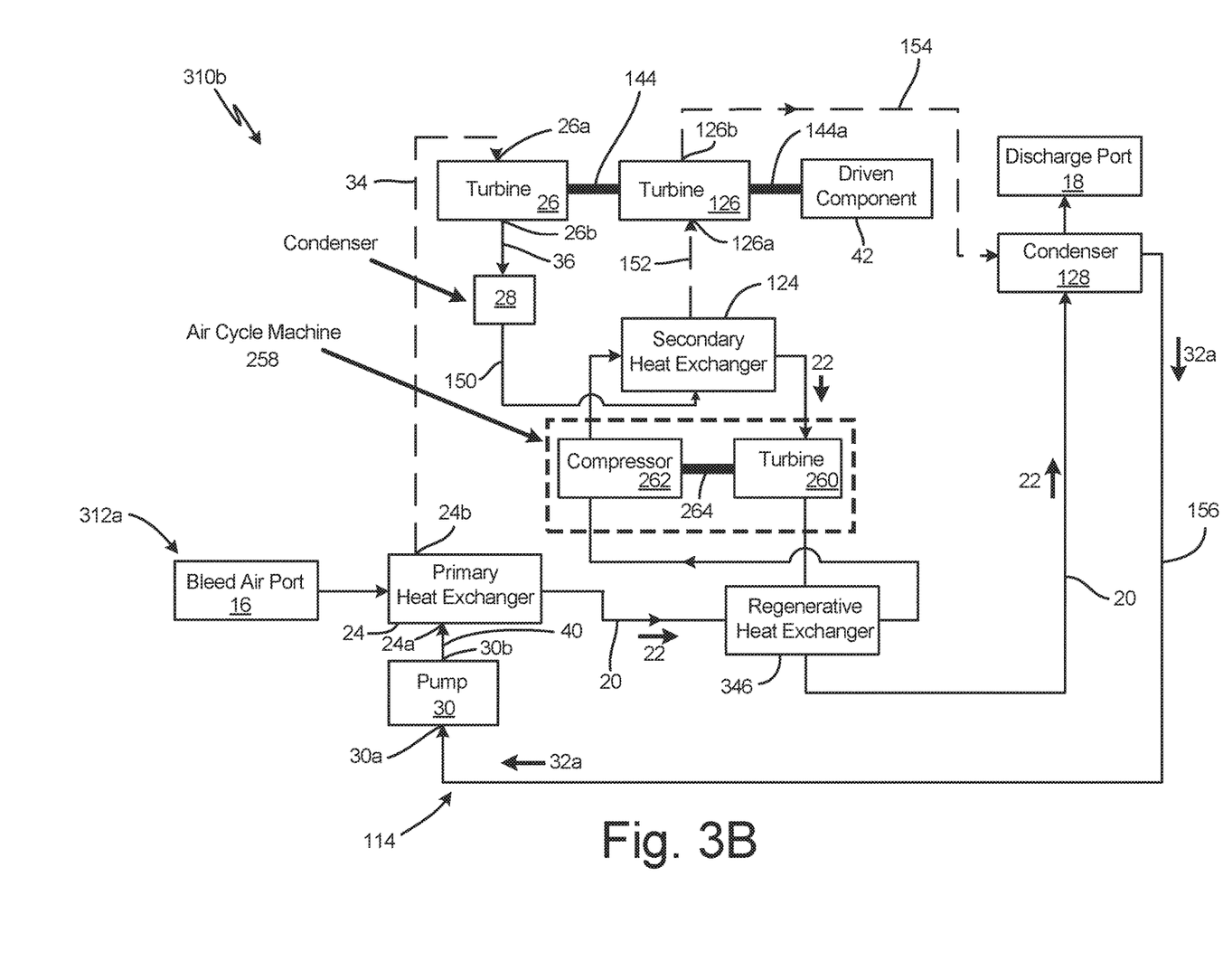
FIG. 3B is a schematic of the bleed-heat-powered Rankine cycle of FIG. 3 that incorporates a regenerative heat exchanger instead of a system heat exchanger.

FIG. 3B is a schematic of bleed heat recovery system 310b, which contains all of the components of system 310 except open-loop path 312 is replaced with open-loop path 312a equipped with regenerative heat exchanger 346 in place of system heat exchanger 46. Regenerative heat exchanger 346 is a heat exchanger of any suitable design that places bleed air 22 discharged from turbine 260 of air cycle machine 258 in a heat exchange relationship with bleed air 22 discharged from heat exchanger 24 and upstream from compressor 262. Accordingly, bleed air 22 discharged from heat exchanger 24 is directed to regenerative heat exchanger 246 instead of to compressor 262. All other identically-numbered components are configured and operate in the same was as previously described. Regenerative heat exchanger 346 has the advantage of pre-cooling bleed air 22 prior to compressor 262 and thereby permits compressor 260 to have a higher compression ratio for a given maximum temperature limit.

Figure 3C:
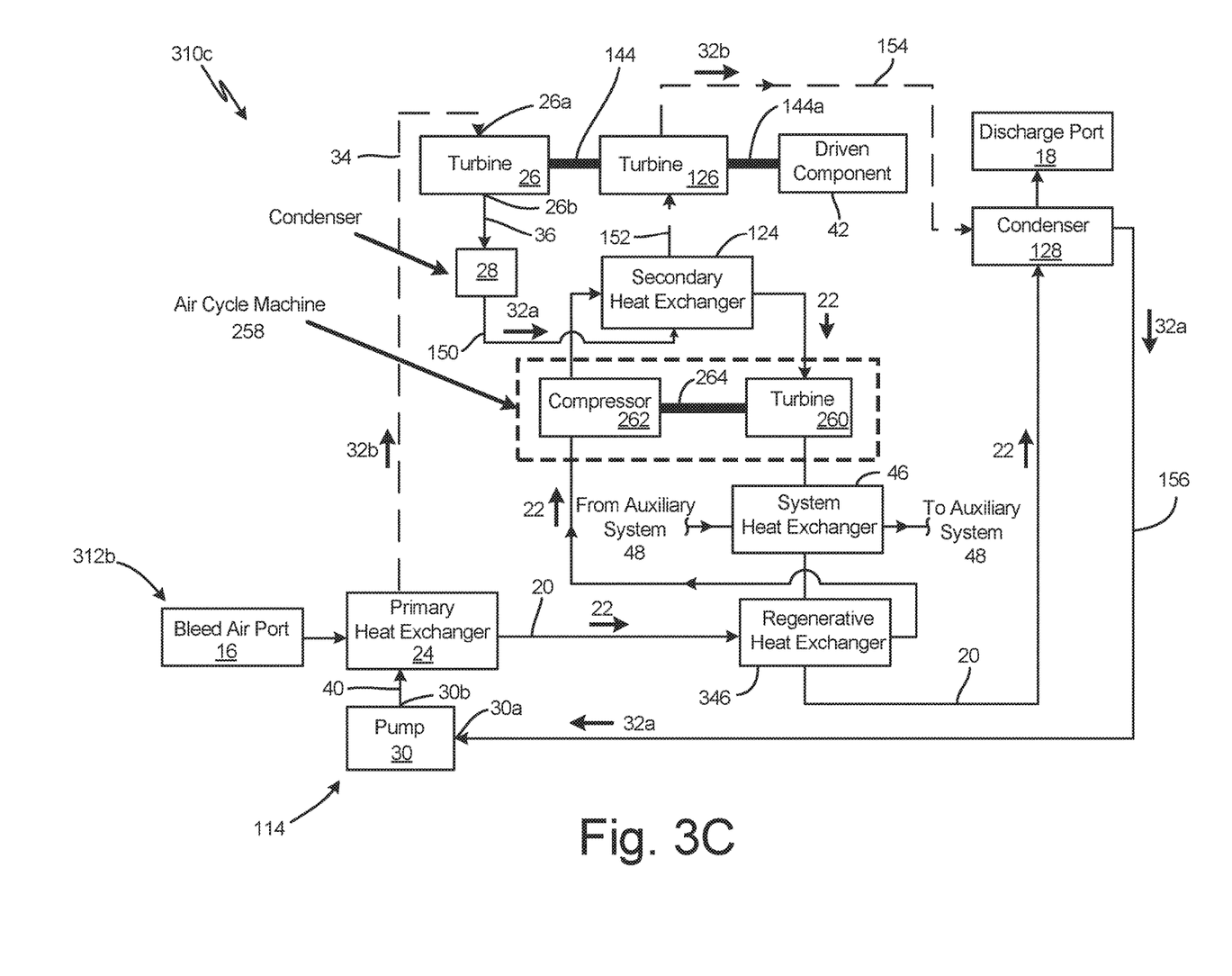
FIG. 3C is a schematic of the bleed-heat-powered Rankine cycle of FIG. 3 that incorporates a regenerative heat exchanger in addition to a system heat exchanger.

FIG. 3C is a schematic of bleed heat recovery system 310c, which contains all of the components of system 310 except open-loop path 312 is replaced with open-loop path 312b equipped with system heat exchanger 46 and regenerative heat exchanger 346. System heat exchanger 46 can be configured and operates as described in system 312. Regenerative heat exchanger 346 is configured and operates as described in system 312b. System heat exchanger 46 can be located along open-loop 312b between turbine 260 and regenerative heat exchanger 346, as shown in FIG. 3C. Alternatively, system heat exchanger 46 can be located along open-loop 312b between regenerative heat exchanger 346 and second condenser 128.

DISCUSSION OF EMBODIMENTS

The following are non-exclusive descriptions of possible embodiments of the present invention.

A system according to an exemplary embodiment of this disclosure, among other possible things includes an open-loop path and a closed-loop path. The open-loop path is configured to extract bleed air from a compressor section of a gas turbine engine through a bleed air port and discharge bleed air to an ambient environment. The closed-loop path is configured to circulate a working fluid and comprises a first heat exchanger, a first turbine, a first condenser, and a pump arranged sequentially in series along a direction of working fluid flow. The first heat exchanger is fluidly coupled to the bleed air port and configured to extract heat from the bleed air to convert the working fluid from a liquid phase at an inlet of the first heat exchanger to a gaseous phase at an outlet of the first heat exchanger. The first turbine is fluidly coupled to the outlet of the first heat exchanger that is rotationally driven by expanding the working fluid across the first turbine from a first turbine inlet to a first turbine outlet. The first condenser is fluidly coupled to the first turbine outlet and is configured to convert the working fluid from the gaseous phase to the liquid phase. The pump is configured to impart work to the working fluid and to deliver the working fluid to the inlet of the first heat exchanger. The system further includes a component rotationally driven by the first turbine.

The system of the preceding paragraph can optionally include, additionally and/or alternatively, any one or more of the following features, configurations and/or additional components:

A further embodiment of the foregoing system, wherein the first condenser can fluidly communicate with the open-loop path such that bleed air flowing through the first condenser extracts heat from the working fluid to convert the working fluid from the gaseous phase to the liquid phase.

A further embodiment of any of the foregoing systems, wherein the driven component can be one of a generator that converts rotary motion to electric power, an auxiliary compressor, and an auxiliary pump.

A further embodiment of any of the foregoing systems, wherein the first condenser can be a flash tank and the system can further include a bypass path fluidly connecting an outlet of the pump to the flash tank in which a first portion of the working fluid discharged into the flash tank via the bypass path condenses a second portion of working fluid discharged into the flash tank via the first turbine.

A further embodiment of any of the foregoing systems that includes a bypass path, wherein the bypass path can include a control valve configured to adjust the flow rate of the first portion of the working fluid discharged into the flash tank.

A further embodiment of any of the foregoing systems that includes a bypass path, wherein the bypass path can include a control valve configured to regulate a pressure of the first portion of the working fluid delivered to the flash tank.

A further embodiment of any of the foregoing systems that includes a bypass path, wherein the bypass path can include a control valve configured to regulate a flow rate of the first portion of the working fluid delivered to the flash tank.

A further embodiment of any of the foregoing systems, wherein the open-loop path can include a compressor and a third turbine arranged sequentially in series along a direction of bleed air flow between the first heat exchanger and the first condenser, and wherein the compressor imparts work to the bleed air discharged from the first heat exchanger, and wherein the bleed air discharged from the compressor drives the third turbine, and wherein the third turbine drives the compressor.

A further embodiment of any of the foregoing systems, wherein the closed-loop path can include a second heat exchanger, a second turbine, and a second condenser arranged sequentially in series along a direction of working fluid flow between an outlet of the first condenser and the pump.

A further embodiment of any of the foregoing systems that includes a second heat exchanger, wherein the second heat exchanger can be fluidly coupled to the bleed air port and can be configured to extract heat from the bleed air to convert the working fluid from the liquid phase at an inlet of the second heat exchanger to the gaseous phase at an outlet of the second heat exchanger.

A further embodiment of any of the foregoing systems that includes a second turbine and a second heat exchanger, wherein the second turbine can be fluidly coupled to the outlet of the second heat exchanger that is rotationally driven by expanding the working fluid across the second turbine from a second turbine inlet to a second turbine outlet.

A further embodiment of any of the foregoing systems that includes a second condenser and a second turbine, wherein the second condenser can be fluidly coupled to the second turbine outlet that is configured to convert the working fluid from the gaseous phase to the liquid phase.

A further embodiment of any of the foregoing systems that includes a second turbine, wherein the system can further include a second component rotationally coupled to and driven by the second turbine.

A further embodiment of any of the foregoing systems that includes a second turbine, wherein the second turbine can be rotationally coupled to the first turbine to rotationally drive the component.

A further embodiment of any of the foregoing systems with a first condenser, a second condenser, or first and second condensers, wherein at least one of the first and second condensers can communicate with the open-loop path such that bleed air flowing through the at least one of the first and second condensers extracts heat from the working fluid to convert the working fluid from the gaseous phase to the liquid phase.

A further embodiment of any of the foregoing systems that includes a first heat exchanger and a second heat exchanger, wherein the open-loop path can include a third turbine driven by bleed air received from the second heat exchanger.

A further embodiment of any of the foregoing systems that includes a first heat exchanger, a second heat exchanger, and a third turbine along the open-loop path, wherein the open-loop path can include a compressor acting on bleed air discharged from the first heat exchanger, and wherein the compressor can discharge the bleed air through the second heat exchanger.

A further embodiment of any of the foregoing systems that includes a first heat exchanger, a second heat exchanger, and a third turbine and a compressor along the open-loop path, wherein the third turbine is rotationally coupled to and drives the compressor.

A further embodiment of any of the foregoing systems, wherein the open-loop path can include a system heat exchanger that receives bleed air from the first heat exchanger and discharges bleed air to the first condenser in which the system heat exchanger places the bleed air in a heat exchange relationship with a medium within the auxiliary system.

A further embodiment of any of the foregoing systems that includes a third turbine along the open-loop path and a second condenser along the closed-loop path, wherein the open-loop path can include a system heat exchanger that receives bleed air from the second heat exchanger and discharges bleed air to the second condenser in which the system heat exchanger places the bleed air in a heat exchange relationship with a medium within the auxiliary system A further embodiment of any of the foregoing systems that includes a system heat exchanger, a third turbine along the open-loop path, and a second condenser along the closed-loop path, wherein the system heat exchanger can receive bleed air from the third turbine and discharges air to the second condenser, and wherein the system heat exchanger places the bleed air in a heat exchanger relationship with a medium within an auxiliary system.

A further embodiment of any of the foregoing systems that includes a system heat exchanger, wherein the system heat exchanger extracts heat from the bleed air and thereby heats the medium within the auxiliary system.

A further embodiment of any of the foregoing systems that includes a compressor and a third turbine along the open-loop path, wherein the system can further include a regenerative heat exchanger that places bleed air discharged from the third turbine in a heat exchange relationship with bleed air discharged from the first heat exchanger and upstream from the compressor.

A method according to an exemplary embodiment of this disclosure, among other possible steps, includes directing bleed air through an open-loop path and circulating a working fluid within a closed-loop path. Directing bleed air through the open-loop path includes: 1) extracting bleed air from a compressor section of a gas turbine engine through a bleed air port, and 2) discharging bleed air to an ambient environment through a discharge port. Circulating the working fluid within the closed-loop path includes: 1) using a pump to circulate working fluid within the closed-loop path, 2) directing the working fluid through a first heat exchanger that places the working fluid in a heat exchange relationship with the bleed air such that the working fluid is converted from a liquid phase at an inlet of the first heat exchanger to a gaseous phase at an outlet of the first heat exchanger, 3) expanding the working fluid in the gaseous phase across a first turbine fluidly coupled to the outlet of the first heat exchanger, and 4) converting the working fluid from the gaseous phase to the liquid phase using a first condenser fluidly coupled to an outlet of the first turbine. The method further includes using the first turbine to rotationally drive a component.

The method of the preceding paragraph can optionally include, additionally and/or alternatively, any one or more of the following steps:

A further embodiment of the foregoing method, wherein circulating the working fluid with the closed-loop path can include directing the working fluid through a second heat exchanger that places the working fluid in a heat exchange relationship with the bleed air such that the working fluid is converted from the liquid phase at an inlet of the second heat exchanger to the gaseous phase at an outlet of the second heat exchanger.

A further embodiment of any of the foregoing methods that includes directing the working fluid through a second heat exchanger, wherein circulating the working fluid within the closed-loop path can include expanding the working fluid in the gaseous phase across a second turbine fluidly coupled to the outlet of the second heat exchanger.

A further embodiment of any of the foregoing methods that includes directing the working fluid through a second heat exchanger and a second turbine, wherein circulating the working fluid within the closed-loop path can include using a second condenser fluidly coupled to an outlet of the second turbine to convert the working fluid in the gaseous phase to the liquid phase.

A further embodiment of any of the foregoing methods that includes directing the working fluid through a second turbine, wherein the method can include using the second turbine to rotationally drive the component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
    an open-loop path configured to extract bleed air from a compressor section of a gas turbine engine through a bleed air port and discharge bleed air to an ambient environment;
    a closed-loop path configured to circulate a working fluid, wherein the closed-loop path comprises, in sequential series along a direction of flow of the working fluid:
        a first heat exchanger fluidly coupled to the bleed air port and configured to extract heat from the bleed air to convert the working fluid from a liquid phase at an inlet of the first heat exchanger to a gaseous phase at an outlet of the first heat exchanger;
        a first turbine fluidly coupled to the outlet of the first heat exchanger that is rotationally driven by expanding the working fluid across the first turbine from a first turbine inlet to a first turbine outlet;
        a first condenser fluidly coupled to the first turbine outlet that is configured to convert the working fluid from the gaseous phase to the liquid phase; and
        a pump configured to impart work to the working fluid and to deliver the working fluid to the inlet of the first heat exchanger;
    a system heat exchanger positioned along the open-loop path to receive bleed air from the first heat exchanger and to discharge bleed air to the first condenser, wherein the system heat exchanger places the bleed air in a heat exchange relationship with a medium within an auxiliary system; and
    a component rotationally coupled to and driven by the first turbine.

2. The system of claim 1, wherein the first condenser fluidly communicates with the open-loop path such that bleed air flowing through the first condenser extracts heat from the working fluid to convert the working fluid from the gaseous phase to the liquid phase.

3. The system of claim 1, wherein the component is one of a generator that converts rotary motion to electric power, an auxiliary compressor, and an auxiliary pump.

4. The system of claim 1, wherein the first condenser is a flash tank, and wherein the closed-loop path further comprises:
    a bypass path fluidly connecting an outlet of the pump to the flash tank, wherein a first portion of the working fluid discharged into the flash tank via the bypass path condenses a second portion of the working fluid discharged into the flash tank via the first turbine.

5. The system of claim 4, wherein the bypass path further comprises:
    a control valve disposed along the bypass path and configured to adjust the flow rate of the first portion of the working fluid discharged into the flash tank.

6. The system of claim 1, wherein the system heat exchanger extracts heat from the bleed air and thereby heats the medium within the auxiliary system.

7. The system of claim 1, wherein the open-loop path further comprises, in sequential series along a direction of bleed air flow between the first heat exchanger and the first condenser:
    a compressor imparting work to the bleed air discharged from the first heat exchanger;
    a third turbine driven by bleed air received from the compressor, wherein the third turbine is coupled to and drives the compressor.

8. The system of claim 7, wherein the system further comprises:
    a regenerative heat exchanger that places bleed air discharged from the third turbine in a heat exchange relationship with bleed air discharged from the first heat exchanger and upstream from the compressor.

9. The system of claim 1, wherein the closed-loop path further comprises, in sequential series along the direction of working fluid flow between the outlet of the first condenser and the pump:
    a second heat exchanger coupled to the bleed air port and configured to extract heat from the bleed air to convert the working fluid from the liquid phase at an inlet of the second heat exchanger to the gaseous phase at an outlet of the second heat exchanger, wherein the second heat exchanger is fluidly coupled to an outlet of the first condenser;
    a second turbine fluidly coupled to the outlet of the second heat exchanger that is rotationally driven by expanding the working fluid across the second turbine from a second turbine inlet to a second turbine outlet; and
    a second condenser fluidly coupled to the second turbine outlet that is configured to convert the working fluid from the gaseous phase to the liquid phase.

10. The system of claim 9, and further comprising:
a second component rotationally coupled to and driven by the second turbine.

11. The system of claim 9, wherein the second turbine is rotationally coupled to the first turbine to rotationally drive the component.

12. The system of claim 9, wherein at least one of the first and second condensers communicates with the open-loop path such that bleed air flowing through the at least one of the first and second condensers extracts heat from the working fluid to convert the working fluid from the gaseous phase to the liquid phase.

13. The system of claim 9, wherein the open-loop path further comprises, in sequential series along a direction of bleed air flow between the second heat exchanger and the second condenser:
a third turbine driven by bleed air received from the second heat exchanger.

14. The system of claim 13, wherein the open-loop path further comprises, in sequential series along the direction of bleed air flow between the first heat exchanger and the second heat exchanger:
a compressor acting on bleed air discharged from the first heat exchanger, wherein the compressor discharges bleed air through the second heat exchanger, and wherein the third turbine is coupled to and drives the compressor.

15. The system of claim 14, wherein the system heat exchanger receives bleed air from the third turbine and discharges bleed air to the second condenser.

16. The system of claim 14, wherein the system further comprises:
a regenerative heat exchanger that places bleed air discharged from the third turbine in a heat exchange relationship with bleed air discharged from the first heat exchanger and upstream from the compressor.

17. The system of claim 15, wherein the system further comprises:
a regenerative heat exchanger that places bleed air discharged from the system heat exchanger in a heat exchange relationship with bleed air discharged from the first heat exchanger and upstream from the compressor.

18. A method comprising:
directing bleed air through an open-loop path comprising:
extracting bleed air from a compressor section of a gas turbine engine through a bleed air port;
directing the bleed air through a system heat exchanger that places the bleed air in a heat exchange relationship with a medium within an auxiliary system; and
discharging bleed air to an ambient environment through a discharge port;
circulating a working fluid within a closed-loop path comprising:
circulating fluid within the closed-loop path using a pump;
directing the working fluid through a first heat exchanger that places the working fluid in a heat exchange relationship with the bleed air such that the working fluid is converted from a liquid phase at an inlet of the first heat exchanger to a gaseous phase at an outlet of the first heat exchanger;
expanding the working fluid in the gaseous phase across a first turbine fluidly coupled to the outlet of the first heat exchanger; and
converting the working fluid from the gaseous phase to the liquid phase using a first condenser fluidly coupled to an outlet of the first turbine; and
driving a component rotationally using the first turbine.

19. The method of claim 18, wherein:
circulating a working fluid within a closed-loop path further comprises:
directing the working fluid through a second heat exchanger that places the working fluid in a heat exchange relationship with the bleed air such that the working fluid is converted from the liquid phase at an inlet of the second heat exchanger to the gaseous phase at an outlet of the second heat exchanger, wherein the second heat exchanger is fluidly coupled to an outlet of the first condenser;
expanding the working fluid in the gaseous phase across a second turbine fluidly coupled to the outlet of the second heat exchanger; and
converting the working fluid from the gaseous phase to the liquid phase using a second condenser fluidly coupled to an outlet of the second turbine; and
the method further comprises:
driving the component rotationally using the second turbine.

* * * * *